United States Patent [19]

Nakajima et al.

[11] 3,976,745

[45] Aug. 24, 1976

[54] PROCESS FOR REDUCING NITROGEN OXIDES TO NITROGEN

[75] Inventors: Fumito Nakajima, Hitachi; Masato Tekeuchi, Katsuta; Shimpei Matsuda, Hitachi; Shigeo Uno, Hitachi; Toshikatsu Mori, Hitachi; Yoshihisa Watanabe; Makoto Imanari, both of Amimachi, all of Japan

[73] Assignees: Mitsubishi Petrochemical Company Limited; Hitachi, Ltd.; Babcock-Hitachi K.K., all of Tokyo, Japan

[22] Filed: Dec. 10, 1974

[21] Appl. No.: 531,309

[30] Foreign Application Priority Data

Dec. 12, 1973 Japan.............................. 48-137683
Dec. 12, 1973 Japan.............................. 48-137684

[52] U.S. Cl. ............................ 423/239; 423/213.5; 423/351
[51] Int. Cl.² ........................................ B01D 53/34
[58] Field of Search.............. 423/213.2, 213.5, 239, 423/351; 60/301

[56] References Cited

UNITED STATES PATENTS 3,885,020   5/1975   Whelan........................... 423/239 X

FOREIGN PATENTS OR APPLICATIONS 810,503     8/1951    Germany ........................... 423/239
1,259,258   1/1968    Germany
662,460    12/1951    United Kingdom.............. 423/213.5

OTHER PUBLICATIONS

Mellor; A Comprehensive Treatise on Inorganic & Theoretical Chemistry; vol. VIII; Longmans, Green & Co.; N.Y. 1928; pp. 394–397 & 428–429.

*Primary Examiner*—G. O. Peters
*Attorney, Agent, or Firm*—Sherman & Shalloway

[57] ABSTRACT

A catalyst composition for reducing nitrogen oxides, which is characterized in that the same contains, as its chief ingredient, A. tin (Sn) as the component A, and
B. at least one metal selected from the group consisting of molybdenum (Mo), tungsten (W), and iron (Fe), as the component (B).

in the form of their oxides, and a process for reducing nitrogen oxides to nitrogen, which comprises contacting a gaseous mixture containing nitrogen oxides and molecular oxygen and a reducing gas with aforesaid catalyst composition at elevated temperatures.

18 Claims, No Drawings

PROCESS FOR REDUCING NITROGEN OXIDES TO NITROGEN

This invention relates to a process for reducing nitrogen oxides to nitrogen by treating the gaseous mixtures containing the nitrogen oxides and oxygen, and to novel catalyst compositions useful for the reduction process.

More particularly, the invention relates to a process for reducing the nitrogen oxides ($NO_x$) contained in, for example, the waste gases from combustion apparatuses such as the various internal combustion engines, power plant boilers, and the like, as well as from the factories treating nitric acid and nitrates, or from iron-making plants, to convert the same to nitrogen; and also to the novel catalyst compositions useful for such reduction process.

The combustion gases and waste gases as above-mentioned contain various forms of nitrogen oxides, such as NO, $N_2O_3$, $NO_2$, $N_2O_4$, and $N_2O_5$, which are collectively referred to as nitrogen oxides.

Many catalysts are known to be useful for the reduction of nitrogen oxides, e.g., NO and $NO_2$, to nitrogen. For example, copper-containing catalysts such as copper oxide-alumina, copper oxide-silica, and copper-chromite, platinum-metals containing catalysts such as platinum-alumina; and rare earth element-containing catalysts such as those containing cerium and lanthanum. According to our reproductive tests, however, those known catalysts invariably possess some weak points in durability, activity, or cost. Concerning the durability, most of the known catalysts are adversely affected by only a minor amount of sulfur-containing compounds such as sulfur dioxide which is found particularly in flue gases. Therefore, at present no catalyst fully satisfactory for practical use has yet been obtained for reducing and removing nitrogen oxides.

The waste gases discharged from various internal combustion engines, combustion furnaces, or from the factories treating nitric acid and nitrates, as aforesaid, contain various gases, besides the nitrogen oxides such as NO and $NO_2$ ($NO_x$), for example, oxygen, carbon dioxide, carbon monoxide, nitrogen, steam, various sulfur oxides, and the like. It has been desired to convert such minor amount of nitrogen oxides contained in the gaseous-mixtures as described above to a harmless gas, for example, nitrogen, with high selectivity and high conversion. However, it is normally very difficult to achieve such result.

The primary object of the invention is to provide catalyst compositions particularly useful for treating various waste gases containing not only nitrogen oxides but also sulfur oxides, with high activity level over prolonged periods, to reduce the nitrogen oxide to nitrogen, in contrast to the majority of conventional catalysts which cannot maintain the high activity for long times, in the presence of the sulfuric acid mist, and the like, which is normally contained in the above-mentioned waste gases: and also the process for reducing the nitrogen oxide using such novel catalyst compositions.

Another object of the invention is to provide novel catalyst compositions for the treatment of gaseous mixtures containing nitrogen oxides and oxygen to reduce the nitrogen oxides to nitrogen with high selectivity and conversion; and the novel process for the reduction.

Still another object of the invention is to provide novel catalyst compositions composed solely of metal components which are biologically absolutely harmless, and therefore different from some of the known catalysts containing injurious metal components, for example, Cr, and which novel catalyst compositions consequently never cause secondary environmental pollution during their use or when discarded after their use, or during their preparation; and also the process for reducing nitrogen oxide using such catalyst compositions.

A further object of the invention is to provide a process of high practical utility, which is applicable not only in the treatment of gaseous mixtures of relatively high nitrogen oxide concentration but also in the treatment of gaseous mixtures containing very minor amounts of nitrogen oxides, such as flue gas, to reduce the nitrogen oxides to nitrogen with high conversion; and also the catalyst compositions usable in such a process for long periods with stability.

An additional object of the invention is to provide a process for treating the waste gases containing nitrogen oxides, in which the ammonia used as the reducing agent exhibits excellent activity over a wide temperature range, can reduce the nitrogen oxide in the waste gases to harmless gas at a high space velocity (SV), and which contributes to minimize the size of catalytic reduction apparatus, and hence, to reduce the equipment cost.

Still other objects and advantages of the invention will become apparent from the following descriptions.

The foregoing objects and advantages of the invention are accomplished by novel catalyst compositions which contain A. tin (Sn) as the component A, and
B. at least one metal selected from the group consisting of molybdenum (Mo), tungsten (W), and iron (Fe), as the component B, in the form of their oxides, as the chief ingredient; and by the process comprising contacting with the catalyst compositions, the gaseous mixtures containing nitrogen oxides and molecular oxygen and a reducing gas, particularly ammonia, at elevated temperatures.

In order to effect the reduction and removal of nitrogen oxides using the catalyst of this invention, any of the well known reducing agents such as hydrogen, hydrocarbon, carbon monoxide, and ammonia, may be used, but for the treatment of flue gases, the advantages of the catalyst of this invention are most conspicuously exhibited when ammonia is used as the reducing agent.

Normally the combustion gases, from which nitrogen oxides are to be removed, contain a molar ratio of oxygen to nitrogen oxides of more than ten to one. Thus, as is well known, when hydrogen, carbon monoxide, hydrocarbons, and the like are used as the reducing agent of the nitrogen oxides in such gaseous mixtures, the reducing agent is first consumed by the oxygen, and the consumption of the agent reaches more than several tens molar times that necessary for the reduction of the nitrogen oxides itself. Such loss of the reducing agent can be drastically reduced, by using ammonia or hydrogen sulfide as the reducing agent.

The known catalysts such as platinum or copper directly supported on an inert carrier such as alumina show strong oxidizing activity to ammonia, and under elevated temperaures invites formation of nitrogen oxides originating from the ammonia. Thus the removing efficiency of nitrogen oxides drops rapidly. For this reason in the reducing system of nitrogen oxides with ammonia using the conventional catalysts, the applicable temperature range, within which the removal of nitrogen oxides is effectively practiced, is extremely narrow. For the industrial scale practice of the reduction, consequently, the reaction temperature must be rigorously controlled, making the procedure objectionably complex.

In clear contrast, when nitrogen oxides are reduced and removed with ammonia in the presence of the catalyst of this invention, the applicable reaction temperature range is as wide as from 160° to 640°C., preferably 200° – 550°C., inter alia 250° – 500°C., invariably achieving excellent removal of nitrogen oxides. Thus the catalyst of this invention shows an epoch-making performance and extremely high durability. It is believed that the catalyst opens the way for industrially advantageous process for eliminating the nitrogen oxides in flue gases, using ammonia as the reducing agent.

Hereinafter the invention will be more specifically explained.

I. The catalyst compositions of the invention:

The catalyst compositions of the invention are characterized in that the same contain, as the chief ingredient, A. tin (Sn) as the component A, and
B. at least one metal selected from the group consisting of molybdenum (Mo), tungsten (W), and iron (Fe), as the component B, in the form of their oxides.

Normally it is satisfactory to use only one of the component B metals concurrently with tin (component A) but two or three of the metals may be used together with said component A.

It is particularly preferred for the catalyst of this invention to contain as the chief ingredient the component A metal (tin) and at least one of the component B metals, as an intimate mixture of their oxides.

Again in the preferred catalyst compositions of the invention, the atomic ratio of tin to the component B metal or metals ranges from 1:0.01 – 1,0, preferably 1:0.02 – 0.5.

However, when iron is used as the component B, it is possible to use the iron exceeding the 1:1 atomic ratio to tin. For instance, a catalyst composition containing iron at a ratio to tin of 1 – 20:1 shows somewhat inferior acid resistance, but tends to have higher activity, particularly at relatively low temperatures such as below 300°C., than that of the catalyst composition in which the ratio of iron is less than 1:1 to tin. Consequently, for the reduction of nitrogen oxides ($NO_x$) to nitrogen in the waste gases containing little acidic substances such as sulfur oxides, not only the catalysts containing 0.01 – 1.0 of iron to 1 of tin in terms of atomic ratio, but also those containing 1.0 – 20 of iron can be quite satisfactorily used for practical purpose.

The catalyst compositions of the invention are not necessarily formed exclusively of the components A and B, but may contain as the third component a minor amount of such a metal or metals as copper, magnesium, aluminium, boron, titanium, silicon, antimony, vanadium, cobalt, nickel, and manganese, with no notable detrimental effect. The atomic ratio of such third component to tin in the catalyst may be no greater than 0.02:1, preferably no greater than 0.01:1.

According to the invention, it is preferred that the metals of the components A and B are in the form of their oxides, and form the finest and most intimate mixture in the catalyst. In order to obtain such intimate mixture, it is convenient as described later to first form as intimate a mixture as possible of the precursors of the components A and B which are convertible to their oxides, and then calcine the mixture as it is or as supported on a suitable carrier. As the useful carriers, any which are inert to the selective reduction of nitrogen oxide intended by the invention can be used. Examples of the carriers include silica, alumina, silica-alumina, diatomaceous earth, acidic terra abla, activated clay, various porcelain materials, zeolites, titania, zirconia, and the like.

The catalyst compositions of the invention can be held on such carriers by the means known per se, for example, impregnation, tumbling granulation, and the like.

When the metal component of the catalyst compositions is chiefly composed of tin and iron, the iron may take the form of not only oxide, but a part thereof, for example, not more than 50% by weight of the iron, may be contained in the form of iron sulfates. Presence of iron sulfates as above occasionally contributes to improve the activity of the catalyst.

2. Preparation of the catalysts:

The catalysts of the invention can be formed either by mixing the oxides of components A and B, or by first forming a mixture of the precursors of those components which are convertible to the oxides, and then calcining the mixture as it is or as held on a suitable carrier to form the oxides of the two components.

In order to form the oxides of an intimate mixture of the components A and B, however, the latter method of preparation is preferred. Particularly by employing the following methods, oxides of intimate mixtures of the components A and B can be obtained, which are useful as the suitable catalysts.

1-*a* Homogeneous solution method

A homogeneously mixed solution of the components A and B is concentrated, dried, and then converted to the oxide of an intimate mixture of the components by such means as, pyrolysis.

1-*b* Coprecipitation method

For example, ammonia water, caustic alkali, alkali carbonate, or the like, is added to the above homogeneously mixed solution to form the mixed precipitate of the compounds of used components which is easily convertible to the corresponding mixture of oxides by pyrolysis, such as hydroxide, carbonate, bicarbonate, and the like. Thereafter the precipitate is heated and converted to the oxide of an intimate mixture of the used components.

2. Concurrent use of solution and precipitation methods

For example, component A alone is precipitated from its solution in advance in the form of, for example, hydroxide, and to which a solution of the other component is added, followed by thorough stirring and mixing. If necessary, a precipitating agent such as aqueous ammonia or caustic alkali may be further added to the resulting mixture to form a precipitate, and the system may be again mechanically mixed if desired. The system is then dried, and converted to the oxide of the intimate mixture of used components, by such means as, for example, pyrolysis.

3. Precipitate-mixing method

The precipitate of each single component in the form convertible to the oxide by pyrolysis with relative ease, such as hydroxide, is formed from the respective single-component solution. The precipitates are then mixed as intimately as possible, dried, and converted to the oxide of the intimate mixture of the components A and B by pyrolysis.

According to the invention, thus the precursors of the critical components A and B are mixed as solutions and/or precipitates of, for example, hydroxides (e.g. hydrous gel) to bring about the intimately mixed state, and then dried and subjected to a calcining treatment described later. Thus the precursors are pyrolyzed, forming the oxide of the intimate mixture of the critical components.

The oxide of the intimate mixture of the components A and B obtained through any of the above-described methods of catalyst preparation can be used either as it is, or may be shaped into the desired configuration and size before the use. For making the shaped catalyst, the intimate mixture of the precursors of the used components may be shaped into the desired configuration and size, optionally dried, and then calcined to be converted to the oxide.

The shaping can be effected by any means known per se, such as extrusion molding, tabletting, tumbling granulation, and the like.

It is also possible to form the catalyst compositions of this invention as supported on suitable carriers, by, for example, at the suitable stage of any of the catalyst-making procedures as described in 1-a, 1-b, 2, and 3, for example, in case of the coprecipitation method of 1-b, adding a suitable amount of an inert, solid carrier to the homogeneously mixed solution of the components A and B, mixing the two, and thereafter depositing on the carrier the precipitate of the components A and B, for example, hydroxide, followed by drying and calcining.

The final calcining treatment mentioned above is normally performed at a suitable temperature within the range of 300° – 800°C., preferably 300° – 700°C. When molybdenum is used as the component B, furthermore, the preferred calcining temperature ranges from 300° to 600°C.

If the calcining temperature is below 300°C., conversion to the oxide is unsatisfactory and hence, active catalyst cannot be obtained. Whereas, when the calcining temperature is higher than the above upper limit, sintering takes place to cause loss of effective surface area of the catalyst or partial decomposition and/or volatilization of the catalytic components, resulting in the reduction of catalytic activity.

As the starting materials of the components A and B for making the catalyst compositions of the invention, any of their oxides and compounds which can form oxides upon heating (precursors) can be used.

Particularly such starting materials which can form oxide at the aforesaid calcining temperature range, and more advantageously can form solution, dispersion, or hydroxide as they are, are preferred.

As the starting materials of tin (the component A), the following may be named by way of examples: tin oxides, metastannic acid and alkali-metal salts of metastannic acid such as sodium metastannate; tin hydroxide; tin halides such as tin chlorides; and organic acid salts of tin such as tin oxalate.

Of the above-named, the alkali metal salts such as sodium metastannate can be conveniently dissolved in an alkaline aqueous solution, but the concurrent presence of alkali metal ion decreases the catalytic acitivity and therefore the ions must be carefully removed.

As the molybdenum source, on the other hand, the following may be named for example: molybdenum oxides, molybdic acid and molybdates such as ammonium molybdate and sodium molybdate; molybdenum halides such as molybdenum chlorides; and silicomolybdic acid and alkali salts thereof such as ammonium silicomolybdate and sodium silicomolybdate.

The convenient tungsten sources include: oxides similar to the above molybdenum source, tungstic acid and salts thereof; tungsten halides such as tungsten chlorides, and silicotungstic acid and alkali salts thereof.

Also the useful starting materials of iron include iron oxides; hydrous iron oxide; inorganic acid salts of iron such as carbonates, nitrates, halides such as chlorides; and organic acid salts of iron such as oxalate and acetates.

As the precipitating agent to be employed when the precipitation method is used for the catalyst preparation, ammonia water, caustic alkali, alkali carbonate, and the like may be named. When the precipitating agent contains an alkali metal, however, the alkali metal ion must be thoroughly removed after the precipitate is formed. If otherwise, the $NO_x$- reducing activity of the catalyst is deteriorated. For this reason the ammonia water is the optimum precipitating agent. Also urea which releases ammonia upon heating, and the like can be used as the precipitating agent.

The preparation of catalyst will be more specifically explained, taking an example of using tungsten as the component B.

A predetermined amount of stannic chloride is dissolved in water, and to which ammonia water is added to form a precipitate of tin, which is thoroughly washed, and recovered by filtration. The precipitate is then well kneaded with an aqueous solution containing ammonium paratungstate, dried, and tableted, or extrusion-molded as it is and dried. At the time of shaping, a part or whole of the catalytic mixture may be preliminarily pyrolyzed to be converted to the mixture of oxides, and then tabletted or extrusion-molded. The obtained shaped product is finally calcined at 300° – 800°C. for 1 – 10 hours. The calcined catalyst is ready for use in the reducing reaction of the present invention.

It should be clearly understood that the above is no more than one specific embodiment of catalyst preparation, and the catalyst of the invention can be prepared by any other methods described in the foregoing.

3. Reducing reaction of nitrogen oxides ($NO_x$)

The nitrogen oxides conceived by the invention includes the various nitrogen oxides which normally can be collectively expressed as $NO_x$, such as NO, $N_2O_3$, $NO_2$, $N_2O_4$, and $N_2O_5$, while the greatest part of the nitrogen oxides contained in flue gas is nitric oxide (NO).

According to our studies, in the reduction of nitric oxide (NO) using ammonia as the reducing agent, the presence of oxygen is extremely useful to promote the reaction. It is desirable, therefore, that no less than 1/4 mol of oxygen per mol of nitric oxide (NO) should be concurrently present. Whereas for the reduction of higher order of oxides of nitrogen other than nitric oxide the concurrent presence of oxygen is not necessarily required.

In the treatment of nitrogen oxide-containing gaseous mixture according to the invention, it is advantageous to add the reducing agents, for example, ammonia, in the amount of approximately 0.5 to 10 molar times the nitrogen oxide in the waste gas, preferably from equimolar to 3 molar times, inter alia, in the vicinity of equimolar amount.

The gaseous mixture is passed on the catalyst at a space velocity (SV) of 2,000 – 100,000/hour, preferably 5,000 – 50,000/hour, the space velocity being the value measured under the assumption that the catalyst-filled zone at 0°C. and 1 atmosphere (normal state - NTP -) is the empty column.

The suitable reaction temperature ranges from 160° – 640°C., as already mentioned, preferably from 200° – 550°C, inter alia, 250° – 500°C. The pressure may be atmospheric to approximately 10 kg/cm², or even higher. When the reaction temperature is below 160°C., the rate of the reaction is too low for practical purpose, while if it is higher than 640°C., the conversion of ammonia to nitrogen oxides increase to make the entire reducing reaction meaningless.

While numbers of incidental devices are necessary for the reactor for practicing the subject invention, because of the high flow rate of the feed gas, basically the conventional fixed bed, moving bed, or fluidized bed-type reactor can be employed.

Thus according to the invention, by contacting a gaseous mixture containing nitrogen oxides ($NO_x$) and molecular oxygen with a catalyst composition of the invention at elevated temperatures, such as from 160° – 640°C., the nitrogen oxides can be reduced to nitrogen at high conversions. Furthermore, the invention has the advantage that the catalyst life in the reduction is extremely long.

Particularly because the catalyst compositions of the invention are made of components harmless to the human body, they are absolutely free from the possibility of causing secondary pollution. The catalysts are furthermore characterized in that, when applied to the treatment of various nitrogen oxides-containing waste gases which also contain acidic substances such as sulfur oxide, still they can maintain the high activity over a prolonged period with stability.

Hereinafter the invention will be more specifically explained with reference to the working examples which are given strictly for the purpose of illustration, and never to be construed to limit the scope of this invention.

EXAMPLE 1 (Sn-Fe catalyst) and Control 1

The catalyst according to the invention and a control catalyst were prepared as follows: Catalyst Sample No. 1

18.8 grams of stannic chloride ($SnCl_4 \cdot XH_2O$) was dissolved in 100 ml of distilled water, and the pH of the solution was lowered by the addition of 300 ml of 3-N hydrochloric acid. Separately, 139 g of ferrous sulfate ($FeSO_4 \cdot 7H_2O$) was dissolved in 500 ml of distilled water. The two solutions were then mixed, to provide 1 liter in total of a homogeneous mixture. To the solution then 3-N ammonia water was added dropwise while oxidizing the system with air. The supply of ammonia water was stopped when the pH reached finally 8.5, but the oxidation with air was further continued for a while.

Then the precipitate recovered was repetitively washed with distilled water and recovered by filtration, dried at approximately 120°C. for 5 hours, preliminarily calcined at 400°C. for 3 hours, thoroughly mixed with 3% by weight thereof of graphite, adjusted of its moisture content, and molded into tablets of 6 mm × 6 mm in diameter and thickness, under a moulding pressure of 3.5 tons. The obtained moulded product was calcined at 500°C. for 5 hours. The catalyst so formed had the composition of Fe:Sn=9:1, atomic ratio. Control catalyst 1

5 milliliters of aqueous hexachloroplatinic acid ($H_2PtCl_6$, 10 g Pt/100 g solution) was diluted with distilled water, into a solution of 70 ml in total, which was subsequently impregnated into 100 g of 10 – 20 mesh active alumina carrier, dried at 120°C. for 5 hours, and then calcined and reduced at 450°C. for 3 hours in hydrogen gas current. The obtained catalyst was a 0.5% by weight alumina-carried platinum catalyst.

Each 4 ml of the above-prepared catalysts was packed in a 17-mm $\phi$ quartz reaction tube. The particle size of the catalyst Sample No. 1 was adjusted to 10 – 20 mesh before the packing. Through each reaction tube a gaseous mixture of the following composition was passed at a space velocity (as converted to the superficial velocity in a column at 0°C. and 1 atm (standard condition -NTP-), wich will be hereinafter abbreviated as SV) of 11,800/hour.

NO 290 – 310 ppm, $NH_3$ 290 – 310 ppm
$SO_2$ 450 – 550 ppm
$O_2$ 2 – 4 %
$CO_2$ 12.5 %
Steam 15 %
$N_2$ Balance.

The correlation of reaction temperature and $NO_x$ reduction ratio was determined, with the results as shown in Table I below.

The $NO_x$ was determined by chemiluminescence system $NO_x$ analyzer.

Table 1

| Reaction Temperature (°C) | Example 1 | Control 1 |
|---|---|---|
| | $NO_x$ Reduction Ratio (%) | |
| 100 | — | 78 |
| 150 | 82 | 96.5 |
| 200 | 93 | 92 |
| 250 | 98 | 62 |
| 300 | ca 100 | 23 |
| 350 | ca 100 | 0 |
| 400 | ca 100 | — |
| 450 | 98 | — |
| 500 | 95 | — |

As is apparent from Table 1, the Control catalyst admittedly exhibited excellent activity at low temperatures, but at above 200°C. the $NO_x$ reduction ratio in the system decreased. Thus the temperature range within which the high $NO_x$ reduction ratio, such as no less than 90%, can be achieved, was as narrow as 120° – 190°C. Furthermore, at above 350°C., the $NO_x$ concentration in the gas at the exit of the catalyst-filled reactor became higher than that in the gas at the entrance.

However, while the catalyst of the Example exhibited somewhat inferior activity at temperature below 200°C at higher temperatures than 200°C. the $NO_x$ reduction ratio was no less than 90%, and particularly at 250° – 500°C, the reduction ratio as high as 95% and above was achieved.

EXAMPLE 2 (Sn-Fe catalyst)

The catalyst of the invention was prepared similarly to the catalyst Sample No. 1, except that the calcining temperature was varied in each run as indicated in Table 2 (Sample Nos. 2–6), and the resulting catalyst compositions were used in the reaction of the gaseous mixture of identical composition with that specified in Example 1, at the SV of 59,000/hour, with the results as shown also in Table 2.

Incidentally, all the catalyst compositions were preliminarily calcined at 300°C.

Table 2

| Catalyst Sample No. | 2 | 3 | 1 | 4 | 5 | 6 |
|---|---|---|---|---|---|---|
| Calcining Temp. (°C.) | | | | | | |
| Reaction Temperature (°C.) | 300 | 400 | 500 | 600 | 700 | 800 |
| | $NO_x$ Reduction Ratio (%) | | | | | |
| 200 | 50.2 | 47.5 | 46.8 | 44.4 | 33.3 | 15.0 |
| 250 | 68.5 | 68.3 | 66.3 | 65.3 | 52.6 | 27.3 |
| 300 | 81.1 | 83.4 | 82.8 | 78.8 | 75.6 | 46.6 |
| 350 | 88.8 | 92.3 | 91.5 | 90.7 | 88.2 | 73.6 |
| 400 | 90.0 | 95.4 | 97.0 | 97.7 | 89.2 | 84.0 |
| 450 | 79.2 | 84.6 | 92.3 | 93.5 | 86.3 | 84.0 |

EXAMPLE 3 (Sn-Fe catalyst)

The catalyst preparation as described in Example 1 was repeated except that the quantitative ratio of Fe to Sn was varied for each catalyst (Sample Nos. 7–13, Control catalysts 2 and 3). The atomic ratio of Fe to Sn in each catalyst, and the results of the reducing reaction under the identical conditions with Example 2 were as indicated in Table 3 below.

Table 3

| Catalyst Sample No. | Fe:Sn (atomic ratio) | $NO_x$ Reduction Ratio (%) | |
|---|---|---|---|
| | | 250°C. | 350°C. |
| Control 2 | 0:10 | 5 | 34 |
| 7 | 0.5:9.5 | 28 | 71 |
| 8 | 1:9 | 40 | 85 |
| 9 | 5:5 | 59.5 | 91 |
| 10 | 8:2 | 67 | 93 |
| 11 | 9:1 | 66.5 | 92 |
| 12 | 9.5:0.5 | 61 | 89 |
| 13 | 9.9:0.1 | 53.5 | 70 |
| Control 3 | 10:0 | 33 | 40 |

From the results shown in Table 3, it can be understood that the addition of tin to iron notably increases the catalytic activity, over a wide quantitative variation of the tin, compared with the catalytic activity of Fe alone. When a minor amount of Fe is added to tin catalyst, the catalytic activity again is improved over that of tin catalyst, but by less degree. The effect of adding tin is particularly conspicuous within the range of Fe:Sn (atomic ratio) equalling 9.5:0.5 – 1:9.

EXAMPLE 4 (Sn-Fe catalyst)

In this Example the results of examining the starting materials of iron are shown. Catalyst Sample No. 14

18.8 grams of stannic chloride ($SnCl_4.XH_2O$) was dissolved in 100 ml of distilled water, and the pH of the solution was lowered by the addition of 300 ml of 3-N hydrochloric acid. Separately 100 g of ferrous chloride ($FeCl_2.XH_2O$) was dissolved in 500 ml of distilled water. The two solutions were combined to make 1 liter in total of a homogeneous solution, which was subsequently processed into the catalyst composition similarly to Sample No. 1. The resulting catalyst had a composition of Fe:Sn = 9:1 by atomic ratio.

Catalyst Sample No. 15

135.2 grams of ferric chloride ($FeCl_3.6H_2O$) and 18.8 g of stannic chloride ($SnCl_4.XH_2O$) were dissolved in distilled water to provide 1 liter in total of a homogeneous solution, which was processed into the catalyst similarly to Sample No. 1. The resulting catalyst had a composition of Fe:Sn = 9:1 by atomic ratio.

Catalyst Sample No. 16

202 grams of ferric nitrate ($Fe(NO_3)_3.9H_2O$) and 18.8 g of stannic chloride ($SnCl_4.XH_2O$) were dissolved in distilled water to provide 1 liter in total of a homogeneous solution, which was subsequently processed into the catalyst composition similarly to Sample No. 1. The resulting catalyst had a composition of Fe:Sn = 9:1 by atomic ratio.

The above catalyst compositions were used in the reaction under the conditions identical with those of Example 2. The results were as shown in Table 4 below.

Table 4

| Catalyst's Sample No. | 14 | 15 | 16 |
|---|---|---|---|
| Source of Iron | $FeCl_2$ | $FeCl_3$ | $Fe(NO_3)_3$ |
| Reaction Temperature (°C.) | $NO_x$ Reduction Ratio (%) | | |
| 200 | 47.7 | 44.3 | 52.1 |
| 250 | 65.0 | 64.2 | 70.3 |
| 300 | 79.0 | 78.5 | 83.8 |
| 350 | 91.2 | 90.6 | 94.5 |
| 400 | 97.8 | 96.8 | 98.0 |
| 450 | 93.0 | 93.5 | 94.0 |

EXAMPLE 5

In this Example the starting materials of tin are examined.

Catalyst Sample No. 17

12.5 grams of stannous chloride ($SnCl_2.H_2O$) was added to 200 ml of 6-N hydrochloric acid, dissolved by heating, and cooled.

Separately, 139 g of ferrous sulfate ($FeSO_4 7H_2O$) was dissolved in 500 ml of distilled water. The two solutions were then mixed, providing 1 liter in total of a homogeneous mixture, which was subsequently processed into a solid catalyst similarly to Sample No. 1 catalyst. The product had the composition of Fe:Sn = 9:1 by atomic ratio.

Catalyst Sample No. 18

11.9 grams of stannous sulfate ($SnSO_4$) was dissolved in 300 ml of 3-N hydrochloric acid. Separately, 139 g of ferrous sulfate ($FeSO_4.7H_2O$) was dissolved in 500 ml of distilled water. The two solutions were then mixed to make 1 liter in total of a homogeneous solution, which was processed into a solid catalyst similarly to Sample No. 1 catalyst. The product had the composition of Fe:SN = 9:1 by atomic ratio.

The above catalysts were used in the reaction performed in the identical manner with Example 2, with the results as shown in Table 5 below.

Table 5

| Catalyst Sample No. | 17 | 18 |
|---|---|---|
| | $NO_x$ Reduction Ratio (%) | |
| Reaction temperature (°C.) | Source of Tin | |
| | $SnCl_2$ | $SnSO_4$ |
| 200 | 46.5 | 44.5 |
| 250 | 66.8 | 65.8 |
| 300 | 82.1 | 80.5 |
| 350 | 92.3 | 92.8 |
| 400 | 97.7 | 96.3 |
| 450 | 94.8 | 92.8 |

EXAMPLE 6 (Sn-Fe catalyst)

In this Example, iron oxide was used as the starting material of iron component, and the catalyst was formed by kneading method.

Catalyst Sample No. 19

To 100 g of ferric oxide ($Fe_2O_3$), 29.8 g of stannous sulfate was added, and further approximately 100 ml of distilled water was added, followed by thorough wet grinding and kneading. The kneaded mass was dried at approximately 120°C. for 5 hours, and further thoroughly kneaded with 3% by weight of graphite, adjusted of the moisture content, and molded into tablets of 6 mm × 6 mm in the diameter and thickness, with a molding pressure of 3.5 tons. The tablets were calcined at 500°C. for 5 hours. The formed catalyst had a composition of Fe:Sn = 9:1 by atomic ratio.

Catalyst Sample No. 20

To 100 g of yellow iron oxide ($\alpha$-FeOOH), 26.8 g of stannous sulfate ($SnSO_4$) was added, and formed into the catalyst through the procedures identical with those applied to Sample No. 19 described above. The resulting catalyst had a composition of Fe:Sn = 9:1 by atomic ratio.

The catalysts were used in the reaction under the identical conditions with those employed in Example 2, with the results as shown in Table 6 below.

Table 6

| Catalyst's Sample No. | 19 | 20 |
|---|---|---|
| | $NO_x$ Reduction Ratio (%) | |
| Reaction temp. (°C.) | Source of Iron | |
| | $Fe_2O_3$ | $\alpha$-FeOOH |
| 250 | 34.7 | 41.5 |
| 300 | 51.2 | 64.2 |
| 350 | 78.5 | 88.0 |
| 400 | 88.8 | 94.2 |
| 450 | 84.0 | 92.0 |

EXAMPLE 7 (Sn-Fe catalyst)

In this Example, alumina-carried catalysts were prepared by precipitation method, all of which being given the composition of Fe:Sn = 9:1 by atomic ratio. The catalytic components' content was varied for each sample as described below.

Catalyst Samples Nos. 21–25

Each predetermined amount of ferric nitrate ($Fe(NO_3)_3.9H_2O$), stannic chloride ($SnCl_4.XH_2O$) and aluminium nitrate ($Al(NO_3)_3.9H_2O$) were dissolved in distilled water, and to the mixed solution 3-N ammonia water was dropped until the pH rose to 9.0. The precipitate formed was alternately washed with distilled water and recovered by filtration repetitively. Finally the precipitate was dried at approximately 120°C. for 5 hours, preliminarily calcined at 400°C. for 3 hours, mixed thoroughly with 3% by weight of graphite, adjusted of the moisture content, and molded into the tablets of 6 mm × 6 mm in diameter and thickness, under a molding pressure of 3.5 tons. The tablets were calcined for 5 hours at 500°C. The iron content of the Samples Nos. 21–25 was regulated to be, as converted to ferric oxide ($Fe_2O_3$), respectively 2, 5, 10, 25, and 65% by weight.

The resulting catalyst compositions were used in the reaction under the identical conditions with those of Example 2, with the results as shown in Table 7.

Table 7

| Catalyst's Sample No. | 21 | 22 | 23 | 24 | 25 |
|---|---|---|---|---|---|
| | $NO_x$ Reaction Ratio (%) | | | | |
| $Fe_2O_3$ (wt. %) | 2 | 5 | 10 | 25 | 65 |
| Reaction Temp. (°C.) | | | | | |
| 200 | 14.1 | 26.6 | 37.2 | 45.7 | 51.2 |
| 250 | 25.7 | 44.9 | 53.4 | 63.4 | 66.5 |
| 300 | 47.0 | 70.1 | 73.7 | 80.1 | 81.5 |
| 350 | 71.4 | 85.8 | 87.8 | 91.4 | 92.3 |
| 400 | 79.3 | 88.2 | 90.3 | 95.0 | 96.4 |
| 450 | 74.3 | 81.2 | 87.7 | 91.5 | 93.2 |

From the above table it became apparent that the iron content, as converted to feric oxide ($Fe_2O_3$) of no less than 2% by weight, preferably no less than 5% by weight, sufficiently exhibits its catalytic activity.

EXAMPLE 8 (Sn-Fe catalyst)

In this Example, a deposition method was employed for making a titania-carried catalyst.

Catalyst Sample No. 26

9.5 grams of stannic chloride ($SnCl_4.XH_2O$) and 67.6 g of ferric chloride ($FeCl_3.6H_2O$) were dissolved in distilled water, to make 1 liter of homogeneous mixed solution. To the solution 40 g of titania ($TiO_2$, anatase form) was added, and then 3-N ammonia water was added dropwise under thorough stirring, until the pH reached 8.5. The precipitate formed was alternately washed well with distilled water and recovered by filtration repetitively, to be substantially completely removed of chlorine ion. Finally the precipitate was dried at 120°C. for 5 hours, preliminarily calcined at 400°C. for 2 hours, thoroughly mixed with 2% by weight of graphite, adjusted of moisture content, and molded into tablets of 6 mm × 6 mm in diameter and thickness, under a molding pressure of 3.5 tons. The tablets were calcined at 500°C. for 3 hours.

The formed catalyst had a composition of Fe:Sn = 9:1 by atomic ratio, and 62.3% by weight thereof was occupied by the titania carrier.

The catalyst was used in the reaction under the identical conditions with those of Example 2, with the results given in Table 8 below.

Table 8

| Catalyst's Sample No. | 26 |
|---|---|
| Reaction temp. (°C.) | NO$_x$ Reduction Ratio (%) |
| 200 | 40.5 |
| 250 | 62.8 |
| 300 | 79.0 |
| 350 | 91.2 |
| 400 | 96.0 |
| 450 | 92.0 |

EXAMPLE 9 (Sn-Fe catalyst)

In this Example, the catalyst of Example 1 (Sample No. 1) was used in the reaction at 350°C., under the same conditions with those employed in the foregoing Examples excepting SV, to examine the correlation of SV and NO$_x$ reduction ratio.

Sv, that is, the flow rate of feed gas, was varied for each run of the reaction under otherwise constant conditions, with the results given in Table 9 below.

Table 9

| Flow Rate of Gas (l/min.) | SV/hr. | NO$_x$ Reduction Ratio (%) |
|---|---|---|
| 0.67 | 10000 | 100 |
| 2.0 | 30000 | 98.8 |
| 3.3 | 50000 | 94.5 |
| 6.7 | 100000 | 80.8 |

The above results indicate that the catalyst of the invention exhibits sufficiently satisfactory activity even when the SV of 100,000/hour is employed.

EXAMPLE 10 (Sn-Fe catalyst)

In this Example the catalyst Sample No. 18 was used in the catalyst's life test, in the catalytic reduction of NO$_x$ with ammonia. Particularly the effect of sulfur oxide concurrently present in the feed gas on the catalyst's life was examined.

The composition of the artificially made gas used in the experiment was as follows:

| NO | 290 – 310 ppm |
|---|---|
| NH$_3$ | 290 – 310 ppm |
| SO$_2$ | 450 – 550 ppm |
| SO$_3$ | 480 – 520 ppm |
| O$_2$ | 2 – 4 % |
| CO$_2$ | 12.5 % |
| Steam | 10 % |
| N$_2$ | Balance |

The SV was 11800/hr., and the reaction temperature was 350°C. The result of the experiment was as given in Table 10 below.

Table 10

| Reaction time (hr). | Catalyst Sample No. 18 NO$_x$ Reduction Ratio (%) |
|---|---|
| Initiating period | 100 |
| 12.5 | 99.0 |
| 25 | 98.0 |
| 50 | 98.2 |
| 75 | — |
| 100 | 97.0 |
| 150 | 98.0 |
| 200 | 98.0 |
| 250 | 98.0 |
| 300 | 98.3 |

Table 10-continued

| Reaction time (hr). | Catalyst Sample No. 18 NO$_x$ Reduction Ratio (%) |
|---|---|
| 312.5 | — |

It is confirmed from the above result that the catalyst Sample No. 18 was little affected by the sulfur oxides concurrently present in the gas, under the severe reaction condition of high SO$_3$ concentration, and after 300 hours of the reaction hardly showed deterioration in catalytic activity, but maintained approximately 98% of NO$_x$ reduction ratio.

EXAMPLE 11

The catalysts of the invention were prepared as follows:

Catalyst Sample No. 27 (Sn-W catalyst)

175.3 grams of stannic chloride (SnCl$_4$.5H$_2$O) was dissolved in 1 liter of distilled water, and 3-N ammonia water was added to the resulting solution until the latter's pH reached 7.5. The precipitate formed was washed thoroughly with distilled water, recovered by filtration, and well kneaded with 14.5 g of ammonium paratungstate [5(NH$_4$)$_2$O.12WO$_3$.5H$_2$O] as dissolved in 300 ml of distilled water, in a mill. The formed slurry was dried for 5 hours at approximately 120°C., preliminarily calcined at 350°C. for 3 hours, thoroughly mixed with 3% by weight of graphite, adjusted of moisture content and molded into the tablets of 6 mm × 6 mm in diameter and thickness, under a molding pressure of 3.5 tons. The tablets were dried and calcined at 500°C. for 5 hours. The obtained catalyst had a composition of Sn:W = 9:1 by atomic ratio.

Catalyst Sample No. 28 (Sn-Mo catalyst)

175.3 grams of stannic chloride (SnCl$_4$.5H$_2$O) was dissolved in 1 liter of distilled water, and to the resulting solution 3-N ammonia water was added until the pH reached 7.5. The precipitate formed was thoroughly washed with distilled water, recovered by filtration, and thoroughly kneaded with 9.8 g of ammonium molybdate [(NH$_4$)$_6$Mo$_7$O$_{24}$.4H$_2$O] as dissolved in 200 ml distilled water, in a mill. The slurry so formed was treated similarly to the above catalyst Sample No. 27. The obtained catalyst had a composition of Sn:Mo = 9:1 by atomic ratio.

The above catalyst were pulverized to 10 – 20 meshes, and 4 ml each was packed in quartz reaction tubes of 17 mm in inner diameter. Through the reaction tubes the gaseous mixture of below-specified composition was passed with the SV of 11800/hour, at various reaction temperatures to determine the correlation of the temperature with NO$_x$ reduction ratio. The results were as shown in Table 11 below, in which the NO$_x$ content was measured with chemiluminescence system NO$_x$ analyzer.

Composition of feed gas

| NO | 190 – 210 ppm |
|---|---|
| NH$_3$ | 240 – 260 ppm |
| SO$_2$ | 450 – 550 ppm |
| O$_2$ | 2 – 4 % |
| CO$_2$ | 12.5 % |
| Steam | 15 % |
| N$_2$ | Balance |

Table 11

| Catalyst's Sample No. | 27 | 28 |
|---|---|---|
| Reaction Temperature (°C.) | NO$_x$ Reduction Ratio (%) | |
| 150 | 85 | 87 |
| 200 | 94 | 94 |
| 250 | 98 | 98.5 |
| 300 | ca 100 | ca 100 |
| 350 | ca 100 | ca 100 |
| 400 | ca 100 | ca 100 |
| 450 | 99.5 | 98 |
| 500 | 98.5 | 94 |

The catalysts showed somewhat inferior activities compared with Control catalyst 1 at low temperatures, but achieved the NO$_x$ reduction of more than 90% at above 170°C., particularly that of more than 95% within the temperature range of 200 – 500°C.

EXAMPLE 12

The catalysts of Sample Nos. 29 – 38 were prepared similarly to Sample Nos. 27 and 28, except that the atomic ratios of Sn:W or Sn:Mo were varied in each sample. The catalysts were used in the reaction described in Example 11, under the SV of 59000/hr., with the results as shown in Tables 12 and 13.

Table 12

| Catalyst Sample No. | 29 | 30 | 31 | 32 | 32 | 33 |
|---|---|---|---|---|---|---|
| Sn:W (atomic ratio) | | | NO$_x$ Reduction Ratio (%) | | | |
| Reaction Temperature (°C.) | 1:9 | 5:5 | 8:2 | 9:1 | 9.5:0.5 | 9.9:0.1 |
| 250 | 35 | 51 | 63 | 64 | 64 | 42 |
| 300 | 41 | 63 | 82 | 84 | 83 | 64 |
| 350 | 49 | 72 | 89 | 91 | 90 | 78 |
| 400 | 42 | 77 | 93 | 93 | 92 | 84 |
| 450 | 30 | 78 | 95 | 94 | 92 | 86 |
| 500 | 21 | 74 | 93 | 93 | 90 | 84 |

Table 13

| Catalyst Sample No. | 34 | 35 | 36 | 28 | 37 | 38 |
|---|---|---|---|---|---|---|
| Sn:Mo (atomic ratio) | | | NO$_x$ Reduction Ratio (%) | | | |
| Reaction temperature (°C.) | 1:9 | 4:6 | 8:2 | 9:1 | 9.5:0.5 | 9.9:0.1 |
| 250 | 38 | 49 | 67 | 71 | 70 | 54 |
| 300 | 46 | 62 | 86 | 88 | 84 | 73 |
| 350 | 45 | 69 | 91 | 91 | 89 | 81 |
| 400 | 40 | 66 | 91 | 90 | 90 | 84 |
| 450 | 32 | 57 | 86 | 87 | 87 | 80 |
| 500 | 21 | 41 | 74 | 78 | 80 | 71 |

As is apparent from the above Tables 12 amd 13, addition of tungsten or molybdenum to tin at wide quantitative variety conspicuously improves the catalytic activity over that of tin alone. The effect is particularly conspicuous when Sn:W or Sn:Mo is within the range of 8:2 to 9.5:0.5, by atomic ratio.

EXAMPLE 13

In this Example the starting materials of tin were examined.

Catalyst Sample No. 39 (Sn-W catalyst)

113 grams of stannous chloride (SnCl$_2$.2H$_2$O) was dissolved in 200 ml of 6-N hydrochloric acid under heating, cooled, and added with distilled water provide 1 liter in total of a solution. The solution was subsequently treated similarly to Sample No. 27. The resulting catalyst had a composition of Sn:W = 9:1 by atomic ratio.

Catalyst Sample No. 40 (Sn-W catalyst)

59.35 grams of tin metal was heated with 150 ml of conc. nitric acid, and the precipitate formed was washed thoroughly with distilled water and recovered by filtration. The precipitate was subsequently treated similarly to Sample No. 27. The formed catalyst had a composition of Sn:W = 9:1 by atomic ratio.

Catalyst Sample No. 41 (Sn-Mo catalyst)

107.4 grams of stannous sulfate (SnSO$_4$) was dissolved in 100 ml of hydrochloric acid (1:1) under heating, cooled, and diluted with distilled water to provide one liter in total of a solution, which was treated subsequently similarly to Sample No. 28. The obtained catalyst had a composition of Sn:Mo = 9:1 by atomic ratio.

The foregoing three catalysts were used in the reaction as described in Example 12, with the results as given in Table 14 below.

Table 14

| Catalyst's Sample No. | 39 | 40 | 41 |
|---|---|---|---|
| Starting Material of Tin | SnCl$_2$ | Sn | SnCl$_4$ |
| Reaction Temperature (°C.) | NO$_x$ Reduction Ratio (%) | | |
| 250 | 61 | 63 | 68 |
| 300 | 83 | 83 | 89 |
| 350 | 91 | 90 | 92 |
| 400 | 92 | 92 | 93 |
| 450 | 92 | 93 | 90 |
| 500 | 90 | 90 | 80 |

EXAMPLE 14 (Sn-W catalyst)

In this Example, silicotungstic acid (SiO$_2$.12WO$_3$.26-H$_2$O) was used as the starting material of tungsten.

Catalyst Sample No. 42

113 grams of stannous chloride (SnCl$_2$.2H$_2$O) was dissolved in 200 ml of 6-N hydrochloric acid under heating, cooled, and diluted with distilled water to provide one liter in total of a solution, to which 3-N ammonia water was added until the pH reached finally 7.5. The formed precipitate was thoroughly washed with distilled wter to be substantially completely removed of chlorine ion, and recovered by filtration. The precipitate was then well kneaded with 15.33 g of silicotungstic acid as dissolved in 30 ml of distilled water, in a mill. The slurry resulting was dried at 120°C., preliminarily calcined at 350°C. for 3 hours, thoroughly mixed with 3 % by weight of graphite, adjusted of moisture content, and molded into the tablets of 6 mm × 6 mm in diameter and thickness under a molding pressure of 3.5 tons. The tablets were dried and calcined for 5 hours at 500°C. The obtained catalyst had the composition of Sn:W:Si = 9:1:1/12, by atomic ratio. This catalyst was ground and pulverized to 10 – 20 mesh, and used in the reaction as described in Example 12, with the results as given in Table 15.

Table 15

| Catalyst Sample No. | 42 |
|---|---|
| Reaction Temperature (°C.) | $NO_x$ Reduction Ratio (%) |
| 250 | 62 |
| 300 | 82 |
| 350 | 89 |
| 400 | 92 |
| 450 | 92 |
| 500 | 91 |

EXAMPLE 15 (Sn-Mo catalyst)

In this Example, the alumina-carried catalysts were prepared by precipitation-kneading method.

The catalysts were prepared to have the composition of Sn:Mo = 9:1 by atomic ratio in all cases, but the contents of the catalytically active components were varied for each sample.

Catalyst Samples Nos. 43–47

Each predetermined amount of stannic chloride ($SnCl_4.5H_2O$) and aluminium nitrate [$Al(NO_3)_3.9H_2O$] were dissolved to provide a homogeneous mixed solution, to which 3-N ammonia water was added until the pH reached 7.5. The formed precipitate was thoroughly washed with distilled water, recovered by filtration, kneaded thoroughly with also the predetermined amount of an aqueous solution of ammonium molybdate [$(NH_4)_6Mo_7O_{24}.4H_2O$] in a mill. The obtained slurry was dried well at approximately 120°C., preliminary calcined at 350°C. for 3 hours, thoroughly kneaded with 3% by weight of graphite, adjusted of the moisture content, and molded into the tablets of 6 mm × 6 mm in diameter and thickness under a molding pressure of 3.5 tons. The resulting product was calcined after drying, at 500°C. for 5 hours.

The tin contents of the catalyst Sample Nos. 43–47 were, as converted to stannic oxide ($SnO_2$), 2, 5, 10, 25, and 70% by weight, respectively. Those catalysts were used in the reducing reaction as described in Example 12, with the results as shown in Table 16 below.

From the results of Table 16 it became apparent that when the tin content is at least 5% by weight, preferably at least 10% by weight, as converted to stannic oxide, the catalyst exhibits satisfactory activity.

Table 16

| Catalyst's Sample No. | 43 | 44 | 45 | 46 | 47 |
|---|---|---|---|---|---|
| $SnO_2$ (wt.%) | 2 | 5 | 10 | 25 | 60 |
| Reaction temperature (°C.) | \multicolumn{5}{c}{$NO_x$ Reduction Ratio (%)} | | | | |
| 250 | 42 | 66 | 69 | 69 | 71 |
| 300 | 57 | 76 | 84 | 87 | 87 |
| 350 | 63 | 81 | 90 | 91 | 92 |
| 400 | 64 | 84 | 91 | 92 | 93 |
| 450 | 62 | 81 | 96 | 89 | 89 |

EXAMPLE 16 (Sn-W catalyst)

In this Example the titania-carried catalysts were prepared by deposition-kneading method.

Catalyst Sample No. 48

87.7 grams of stannic chloride ($SnCl_4.5H_2O$) was dissolved in 500 ml of distilled water. To the solution 103 g of titania powder ($TiO_2$, anatase form) was added, mixed well, and further 3-N ammonia water was added until the pH finally reached 7.5. The precipitate formed was thoroughly washed with distilled water, recovered by filtration, and thoroughly kneaded with 7.3 g of ammonium paratungstate [$5(NH_4)_2O.1-2WO_3.5H_2O$] as dissolved in 150 ml of distilled water, in a mill. The resulting slurry was subsequently processed similarly to Sample No. 27.

The obtained catalyst had a composition of Sn:W = 9:1, and contained 70% by weight of the titania carrier.

Catalyst Sample No. 49

To a solution of 87.7 g of stannic chloride ($SnCl_4.5H_2O$) as dissolved in 500 ml of distilled water, 77.4 g of titania ($TiO_2$, anatase form) powder was added, and then 3-N ammonia water was added with sufficient stirring until the pH reached 7.5. The formed precipitate was washed thoroughly with distilled water recovered by filtration, and thoroughly kneaded with 4.9 g of ammonium molybdate [$(NH_4)_6Mo_7O_{24}.4H_2O$] as dissolved in 100 ml of distilled water, in a mill. The slurry was subsequently treated similarly to Sample No. 28.

The formed catalyst had a composition of Sn:Mo=9:1 by atomic ratio, and contained 65% by weight of titania carrier.

The above catalysts were used in the reaction as described in Example 12, with the results as given in Table 17 below.

Table 17

| Catalyst's Sample No. | 48 | 49 |
|---|---|---|
| Reaction Temperature (°C.) | \multicolumn{2}{c}{$NO_x$ Reduction Ratio (%)} | |
| 250 | 60 | 68 |
| 300 | 82 | 87 |
| 350 | 89 | 92 |
| 400 | 93 | 91 |
| 450 | 95 | 86 |

EXAMPLE 17 (Sn-W catalyst)

In this Example the catalyst Sample No. 27 was used in the reaction at 350°C. and a fixed set of conditions excepting SV, to examine the correlation of SV with $NO_x$ reduction ratio.

The experiments were run under the identical reaction conditions as in Example 11 except that SV, that is, the flow rate of the feed gas, was varied for each run. The results were as given in Table 18 below.

Table 18

| Flow rate of gas (l/min.) | SV/hr. | NO$_x$ Reduction Ratio (%) |
|---|---|---|
| 0.67 | 10,000 | 99 |
| 2.0 | 30,000 | 97 |
| 3.3 | 50,000 | 93 |
| 6.7 | 100,000 | 87 |

The above results indicates that the catalyst according to the invention exhibits sufficient catalytic activity even at the SV of 100,000/hr.

EXAMPLE 18 (Sn-Mo catalyst)

In this Example, the catalyst Sample No. 28 was used in the catalyst's life test in the NO$_x$-reducing reaction with ammonia. Particularly the effect of sulfur oxide in the feed gas on the catalyst was examined.

The composition of the artificially made gas used in the experiments was as follows.

| NO | 190 – 210 ppm |
|---|---|
| NH$_3$ | 240 – 260 ppm |
| SO$_2$ | 450 – 550 ppm |
| SO$_3$ | 480 – 520 ppm |
| O$_2$ | 2 – 4 % |
| CO$_2$ | 12.5 % |
| Steam | 10 % |
| N$_2$ | Balance |

The SV was 11800/hr., and the reaction temperature was 350°C. The results were as shown in Table 19 below.

Table 19

| Reaction Time (hrs) | Catalyst Sample No. 28 NO$_x$ Reduction Ratio (%) |
|---|---|
| Initiating period | 100 |
| 12.5 | 96.8 |
| 25 | 99.0 |
| 50 | 99.5 |
| 75 | 99.0 |
| 100 | 99.0 |
| 150 | 98.9 |
| 200 | 99.0 |
| 250 | 98.9 |
| 300 | — |
| 312.5 | 99.0 |

Under the rigorous test condition, i.e., the high SO$_3$ concentration in the reaction gas, the catalyst Sample No. 28 of the invention was little affected by the concurrently present sulfur oxide, showing hardly any decrease in catalytic activity after 300 hours of continuous use and maintaining the NO$_x$ reduction ratio of approximately 99%.

EXAMPLE 19 (Sn-Mo catalyst)

The catalyst Sample No. 28 was used in the catalytic reduction with ammonia of a gaseous mixture containing plural nitrogen oxides, to examine the NO$_x$ reduction ratio.

The composition of the artificially prepared gas used in the experiments was as follows:

| NO | 240 – 260 ppm |
|---|---|
| NO$_2$ | 150 – 180 ppm |
| N$_2$O$_5$ | 150 – 180 ppm |
| SO$_2$ | 450 – 550 ppm |

-continued

| SO$_3$ | 480 – 520 ppm |
|---|---|
| O$_2$ | 2 – 4 % |
| CO$_2$ | 12.5 – 14.5 % |
| Steam | 8 – 11 % |
| N$_2$ | Balance |
| Soot | 60 – 90 mg/Nm$^3$ |

To the above gas 720 – 820 ppm of ammonia was added, and the mixture was passed on the catalyst at the SV of 11800/hr., and at 350°C. for 2000 hours continuously. The results were as shown in Table 20 below.

Table 20

| Reaction Time (hrs.) | NO$_x$ Reduction Ratio (%) |
|---|---|
| Initiating Period | Ca 100 |
| 250 | Ca 100 |
| 500 | Ca 100 |
| 750 | 99 |
| 1000 | 99 |
| 1250 | 99 |
| 1500 | 98 |
| 1750 | 98 |
| 2000 | 98 |

As is apparent from the Table 29, of the catalyst of this invention exhibits excellent catalyst life regardless the presence of more than one type of nitrogen oxide in the feed gas.

EXAMPLE 20 (Sn-Fe catalyst)

The catalyst Sample No. 18 was used in the reaction of a gaseous mixture containing plural types of nitrogen oxides with ammonia, and the NO$_x$ reduction ratio was examined. The composition of the artificially formed gas used in the experiment was as follows:

| NO | 240 – 260 ppm |
|---|---|
| NO$_2$ | 150 – 180 ppm |
| N$_2$O$_5$ | 150 – 180 ppm |
| SO$_2$ | 450 – 550 ppm |
| SO$_3$ | 480 – 520 ppm |
| O$_2$ | 2 – 4 % |
| CO$_2$ | 12.5 – 14.5 % |
| Steam | 8 – 11 % |
| N$_2$ | Balance |
| Soot | 60 – 90 mg/Nm$^3$ |

To the same gas 720 – 820 ppm of ammonia was added, and passed onto the catalyst at the SV of 11800/hr., at 350°C., for 2000 hours continuously. The results were as shown in Table 21.

Table 21

| Catalyst Sample No. Reaction Time (hrs.) | 18 NO$_x$ Reduction Ratio (%) |
|---|---|
| Initiating Period | Ca 100 |
| 250 | Ca 100 |
| 500 | 99 |
| 750 | 98 |
| 1000 | 98 |
| 1250 | 97 |
| 1500 | 96 |
| 1750 | 96 |
| 2000 | 97 |

As is apparent from above Table 21, the catalyst of this invention exhibits excellent catalyst life regardless of the presence of more than one type of nitrogen oxide in the feed gas.

We claim:

1. A process for reducing nitrogen oxides to nitrogen, which comprises contacting a gaseous mixture containing nitrogen oxides and molecular oxygen and ammonia with the catalyst composition containing as its chief ingredient:

A. tin as the component A, and
B. at least one metal selected from the group consisting of molybdenum, tungsten, and iron, as the component B, in the form of an intimate mixture of their oxides, at elevated temperatures.

2. The process according to claim 1, in which the elevated temperature ranges from 160° to 640°C.

3. The process according to claim 1, in which the elevated temperature ranges from 250° to 500°C.

4. The process according to claim 1 in which the gaseous mixture contains at least ¼ mol of molecular oxygen per mol of the nitric oxide (NO) contained therein.

5. The process according to claim 1 in which ammonia as the reducing gas is used at the ratio of 0.5–10 molar times the nitrogen oxide ($NO_x$) contained in the gaseous mixture.

6. The process of claim 1 wherein the atomic ratio of tin to component B, as the metal, ranges from 1:0.01 to 1:1.0.

7. The process of claim 1 wherein the atomic ratio of tin to component B, as the metal, ranges from 1:0.02 to 1:0.5.

8. The process of claim 1 wherein said catalyst composition is supported on an inert, solid carrier.

9. The process of claim 1 wherein said gaseous mixture is flue gas which further includes sulfur oxides.

10. The process of claim 1 wherein the component B metal is iron and said gaseous mixture containing nitrogen oxides and molecular oxygen and ammonia are contacted with said catalyst composition at a temperature of from 160°C to 300°C and, wherein the atomic ratio of tin to iron in said catalyst composition is in the range of from 1:1 to 1:20.

11. The process of claim 10 wherein up to 50% by weight of the iron is in the form of iron sulfates.

12. The process of claim 1 wherein said catalyst composition further includes a minor amount of (C) at least one metal selected from the group consisting of copper, magnesium, aluminum, boron, titanium, silicon, antimony, vanadium, cobalt, nickel and manganese, the atomic ratio of component (C) to tin being no greater than 0.02:1.

13. The process of claim 1 wherein the component B metal is molybdenum.

14. The process of claim 1 wherein the component B metal is tungsten.

15. The process of claim 1 wherein the component B metal is iron and wherein the atomic ratio of iron to tin in said catalyst composition is in the range of from 9.5:0.5 to 1:9.

16. The process of claim 15 wherein said catalyst composition is supported on an inert, solid carrier and wherein said catalyst composition includes at least 5% by weight of iron, calculated as $Fe_2O_3$.

17. The process of claim 13 wherein the atomic ratio of tin to molybdenum is within the range of 8:2 to 9.5:0.5.

18. The process of claim 14, wherein the atomic ratio of tin to tungsten is within the range of 8:2 to 9.5:0.5.

* * * * *